(12) United States Patent
Chiu

(10) Patent No.: US 10,607,190 B2
(45) Date of Patent: *Mar. 31, 2020

(54) MOBILE CHECK-IN WITH PUSH NOTIFICATION SERVICES

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,947

(22) Filed: Mar. 11, 2019

(65) Prior Publication Data

US 2019/0205799 A1     Jul. 4, 2019

Related U.S. Application Data

(62) Division of application No. 14/874,532, filed on Oct. 5, 2015, now Pat. No. 10,275,725, which is a division of application No. 14/705,168, filed on May 6, 2015, now Pat. No. 10,467,597.

(30) Foreign Application Priority Data

May 26, 2014  (TW) .............................. 103118222 A
Mar. 5, 2015   (TW) .............................. 104106977 A

(51) Int. Cl.
*H04W 68/00*     (2009.01)
*G06Q 10/10*     (2012.01)
*H04W 4/029*     (2018.01)
*H04L 29/08*     (2006.01)
*H04M 1/725*     (2006.01)
*H04L 29/06*     (2006.01)
*H04W 4/02*      (2018.01)

(52) U.S. Cl.
CPC ........ *G06Q 10/1091* (2013.01); *H04L 67/26* (2013.01); *H04M 1/72566* (2013.01); *H04W 4/029* (2018.02); *H04L 63/0823* (2013.01); *H04W 4/02* (2013.01)

(58) Field of Classification Search
CPC ........... G06Q 10/02; G06Q 10/063114; G06Q 10/1091; H04L 67/26; H04M 1/72566; H04W 4/02
See application file for complete search history.

(56) References Cited

FOREIGN PATENT DOCUMENTS

TW     200841277 A     10/2008
TW     I327297 B       7/2010
TW     201033942 A     9/2010

*Primary Examiner* — Pakee Fang
(74) *Attorney, Agent, or Firm* — Locke Lord LLP; Tim Tingkang Xia, Esq.

(57) ABSTRACT

A system and method of mobile check-in are provided. The system includes a cloud composed of a database, a server, and a push gateway. The server generates a check-in request and sends the check-in request in the form of a push notification to a specific mobile communication device through the push gateway and an external push server. All executable functions of the mobile communication device are locked until a check-in operation is completed.

9 Claims, 6 Drawing Sheets

MOBILE CHECK-IN WITH PUSH NOTIFICATION SERVICES

RELATED APPLICATIONS

This application is a Divisional of U.S. application Ser. No. 14/874,532, filed on Oct. 5, 2015, now approved, which is a Divisional of U.S. application Ser. No. 14/705,168, filed on May 6, 2015 and claims priority under 35 U.S. C. § 119(a) on Patent Application No. 103118222, filed in Taiwan on May 26, 2014 and Patent Application No. 104106977, filed in Taiwan on Mar. 5, 2015, the contents of each are hereby expressly incorporated by reference into the present application.

BACKGROUND OF THE INVENTION

Field of the Invention

The present invention relates to cloud technology applicable to mobile communication devices, and more particularly, to a system and method of mobile check-in.

Description of the Prior Art

Employee attendance management and evaluation systems are switching from conventional fixed check-in clocks to smartphones or palm-held computers, and in consequence employee attendance management and evaluation nowadays is no longer restricted to a fixed place. However, the prior art still has so many technical drawbacks that it fails to meet the needs for mobile attendance management and evaluation carried out by commercial organizations.

Taiwan Patent 1327297, entitled Method of Evaluating Employee Attendance (hereinafter referred to as "citation 1"), discloses a method of evaluating employee attendance. The method essentially comprises using a positioning server and a mobile positioning attendance recorder to provide positioning data to an attendance recording apparatus device for creating an attendance data. The positioning server and the mobile positioning attendance recorder are connected by a wireless communication network. The positioning server fetches positioning data (related to latitude and longitude, for example) pertaining to the mobile positioning attendance recorder (held by an employee under attendance evaluation). Then, an attendance recording apparatus generates attendance data in accordance with the positioning data. The technical problem to be solved by citation 1 is that conventional means of attendance evaluation has drawbacks as follows: 1. the operation costs are high, and an attendance recording apparatus is usually disposed at a fixed location; 2. employees' attendance behavior is not necessarily recognized by the attendance recording apparatus; and 3. attendance evaluation data cannot be provided in a real-time manner (see citation 1, the specification, paragraphs [0004]~[0007]). The technical effect produced by citation 1 is as follows: it provides a way of performing employee attendance evaluation by positioning a wireless communication device, so as to provide an attendance evaluation method for use with convenient real-time data.

Taiwan's Published Patent Application 200841277, entitled Wireless Check-in Method (hereinafter referred to as "citation 2"), discloses a wireless check-in method for use with a wireless check-in device. The wireless check-in device sends a broadcast packet to thereby fetch a connection confirmation packet sent from a wireless communication device and create a connection with the wireless communication device. If it is confirmed that an identity information in the connection confirmation packet is already recorded in a check-in database of the wireless check-in device, the time at which the wireless check-in device fetches the connection confirmation packet is stored in the check-in database in a manner to match the identity information and thus recorded as the work starting time, so as to effectuate automatic check-in, thereby reducing manpower demand and cutting costs. The technical problem to be solved by citation 2 is that, in practice, conventional paper cards and magnetic stripe cards have drawbacks (see citation 2, the specification, paragraphs [0002]~[0003].) The technical effect produced by citation 2 are as follows: providing a wireless check-in method whereby a wireless check-in device sends a broadcast packet regularly to fetch a connection confirmation packet sent from a wireless communication device and creates a connection with the wireless communication device; upon confirmation that an identity information in the connection confirmation packet is already recorded in a check-in database of the wireless check-in device, the state of connection between the wireless check-in device and the wireless communication device undergoes confirmation regularly; and the time of the last connection between the wireless check-in device and the wireless communication device is identified as soon as the wireless check-in device disconnects from the wireless communication device.

Taiwan's Published Patent Application 201033942, entitled Method and System of Processing Online Check-in and Mobile Attendance Recording (hereinafter referred to as "citation 3"), discloses a method and system of processing online check-in and mobile attendance recording. The method and system are applicable to a mobile electronic device, such as a smartphone or a palm-held computer, to allow a user (especially an employee) to complete a check-in process online and give a presentation online while working outdoors, for example, on a business trip or a visit to a customer. The advantages of the method and system are as follows: employees complete a work check-in process online on a business trip; and supervisors find it easier and more convenient to be informed of and understand employees' attendance. The technical problem to be solved by citation 3 is that a conventional check-in clock is disposed in a positioning device and thus brings inconvenience to employees on a business trip (see citation 3, the specification, paragraphs [0002]~[0003]). The technical effect produced by citation 3 is that it provides a method and system of processing online check-in and mobile attendance recording to allow employees to complete a work check-in process online on a business trip.

The positioning server of citation 1, the wireless check-in device of citation 2, and the servo host of citation 3 are not equipped with any organization management module each to otherwise address issues, such as "a commercial organization requires a flexible multilevel structure and generates a check-in request at a specific level" and "serving numerous commercial organizations with a single cloud system." None of citations 1, 2 and 3 discloses sending a check-in request to a specific department of a multilevel company while employees of the specific department are on a group business trip. Although citations 1, 2 and 3 each disclose constructing a check-in system in a commercial organization, none discloses allowing numerous commercial organizations to share the same check-in system. Citations 1, 2 and 3 each have a further drawback, that is, it is impossible to "use a single application and a single connecting interface to access a hybrid cloud system" between the wireless client end and the cloud server, because citations 1, 2 and 3 involve developing an application dedicated to a check-in system of a specific commercial organization, and in consequence the check-in systems of commercial organizations have their respective connecting interfaces. A further drawback associated with citations 1, 2 and 3 is that the wireless client end is incapable of "effectuating compulsory check-in" or "specifying a check-in/gathering point (i.e., rendezvous)." Moreover, the technical measures taken by citations 1, 2 and 3 and resultant technical effect thereof have nothing to do with any mobile check-in system based on cloud technology. Accordingly, it is necessary to provide a mobile cloud system whereby commercial organizations manage employees' attendance and performance evaluation, so as to overcome the drawbacks of the prior art.

SUMMARY OF THE INVENTION

In view of the aforesaid drawbacks of the prior art, the present invention provides a cloud-based mobile check-in system and method and a cloud system with a hybrid cloud model to provide a technology of connecting a single application (also known as App for short) to a single connecting interface and a compulsory check-in request technology, allow check-in locations (i.e., rendezvous) to be specified at will so as for a plurality of commercial organizations to share a system for managing employees' attendance and performance evaluation, and use a single application for all the commercial organizations to access a hybrid cloud system such that the commercial organizations each manage independently information uploaded from the mobile communication devices.

The present invention provides a mobile check-in system, comprising: a database for storing a plurality of member information, the member information each comprising at least one organization ID and a check-in information, and each said organization ID corresponding to an organization; a server for accessing the database and creating a network connection with at least one mobile communication device having one of the member information, wherein the server generates a check-in request in accordance with e-map coordinates, a specified time, and a recipient list, wherein the recipient list comprises at least one push ID corresponding to one of the member information; and a push gateway for generating a push notification in accordance with the check-in request and sending the push notification to the mobile communication device through a push server, wherein the server receives through the network connection the check-in information and the organization ID uploaded from the mobile communication device, the organization ID being for use in verification, and the check-in information being stored in the database. The check-in information contained in the member information and related to a specific period is compiled by the server to become an attendance information. A cloud comprises the database, the server, and the push gateway.

The mobile check-in system of the present invention further comprises a mobile communication device disposed at a client end. The mobile communication device comprises a positioning module and executes an application. The positioning module generates current coordinates in accordance with the current location of the mobile communication device. The mobile communication device executes the application and creates a network connection with the server. The mobile communication device executes the application to log in to the server and receive the organization ID entered such that the organization ID is uploaded to the server through the network connection. After the mobile communication device executes the application to receive the push notification, all executable functions of the application enabled with the organization ID are locked until the application executes a check-in operation, wherein the check-in operation is performed at the e-map coordinates or within a distance of the e-map coordinates in accordance with the specified time of the check-in request. The application receives or automatically generates a check-in instruction for generating the check-in information and uploads the check-in information to the server through the network connection. The check-in information each comprises a check-in time stamp and the current coordinates. The mobile communication device executes the application to generate a reminding alert in accordance with the e-map coordinates and the specified time of the check-in request. The system of the present invention is characterized in that the cloud comprises the database, the server, and the push gateway. Modules attributed to the server and adapted to execute various technical means belong to a servo module group. The servo module group is not only characterized by modularization and distribution-oriented design but is also disintegrated and disposed in different IDC (i.e., internet data center).

The present invention provides a mobile check-in method, applicable to a cloud comprising a database, a server, and a push gateway, the method comprises the steps of: storing in the database a plurality of member information each comprising at least one organization ID and a check-in information, wherein each said organization ID corresponds to an organization, wherein the organization is a single level organization or a multilevel organization; creating a network connection between the server and at least one mobile communication device having one of the member information; receiving, by the server and through the network connection, the check-in information and the organization ID uploaded from the mobile communication device to undergo verification; generating a check-in request by the server in accordance with e-map coordinates, a specified time, and a recipient list, wherein the recipient list comprises at least one push ID corresponding to one of the member information; generating a push notification by the push gateway in accordance with the check-in request, and sending the push notification to the mobile communication device through a push server; receiving, by the server and through the network connection, the check-in information uploaded from the mobile communication device so as to store the check-in information in the database, wherein the check-in information contained in the member information and related to a specific period is compiled to become an attendance information; and generating a push notification by the push gateway in accordance with the check-in request and sending the push notification to the mobile communication device through a push server.

The present invention further provides a mobile check-in method, applicable to a mobile communication device for use in accessing a cloud, the cloud comprising a database, a server, and a push gateway, wherein the database stores therein a plurality of member information each comprising at least one organization ID and a check-in information, the method comprising the steps of: creating a network connection between the server and the mobile communication device having one of the member information; receiving the organization ID entered through an input interface of the mobile communication device and uploading the organization ID to the server through the network connection; locking all executable functions enabled with the organization ID after receipt of a push notification related to a check-in request, wherein the executable functions are unlocked after the mobile communication device executes a check-in operation, wherein the check-in request comprises e-map coordinates and a specified time, wherein the check-in operation entails generating the check-in information in accordance with the specified time of the check-in request and at the e-map coordinates or within a distance of the e-map coordinates and uploading the check-in information to the server through the network connection, wherein the check-in information each comprises a check-in time stamp and current coordinates. The mobile check-in method of the present invention further comprises generating a reminding alert in accordance with the e-map coordinates and the specified time of the check-in request.

The present invention further provides a cloud system, comprising a public cloud system and at least one private cloud system, wherein the public cloud system comprises: a first database for storing a plurality of member information each comprising at least one organization ID each corresponding to an organization; and a first server for accessing the first database and receiving the organization ID uploaded from at least one mobile communication device having the member information so as to undergo login verification, wherein the private cloud system comprises: a second server for receiving information uploaded from the mobile communication device; and a second database for storing information uploaded from the mobile communication device and received by the second server, wherein the first server redirects the mobile communication device corresponding to the private cloud system to the second server in accordance with a servo module location-related information. The mobile communication device executes an application to receive at least one organization ID entered, upload the organization ID to the first server of the public cloud system, and effectuate redirection to the second server of the private cloud system in accordance with the servo module location-related information stored in the first server.

The embodiments below describe the features and advantages of the present invention in detail, and their contents are sufficient to allow any person skilled in the art to understand the technical solutions of the present invention and implement them accordingly. The disclosure of the specification, claims, and drawings enable any person skilled in the art to understand the objectives and advantages of the present invention easily.

DETAILED DESCRIPTION OF THE EMBODIMENTS

Figure 1:
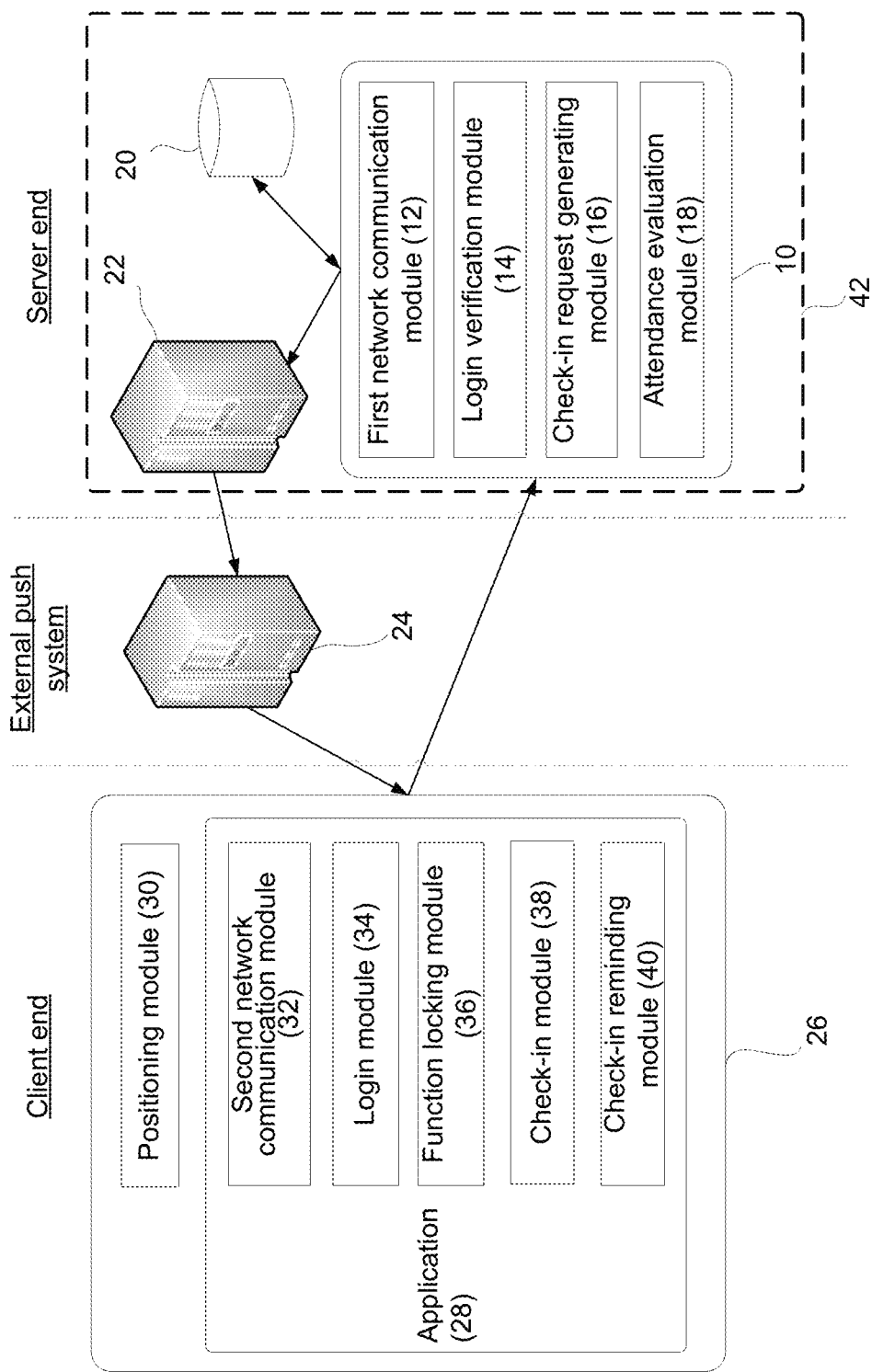
FIG. 1 is a schematic view of the system architecture according to an embodiment of the present invention.

Referring to FIG. 1, there is shown a schematic view of the system architecture according to a preferred embodiment of the present invention. The system comprises a database 20 disposed at a server end (i.e., a cloud 42 of the present invention), a server 10, and a push gateway 22, and a mobile communication device 26 disposed at a client end. The database 20 is defined with a plurality of organizations. The organizations are companies or clubs. Each organization is defined with a unique organization ID. Hence, from the perspective of the system of the present invention, the system of the present invention assigns a unique organization ID to each newly established organization such that the organizations have a one-to-one relation with the organization IDs stored in an organizational table. In an embodiment of the present invention, the organizations (and their respective organization IDs) are defined with a hierarchical namespace data structure such that, once the organization IDs are set, the organizations can shut out all outsiders (that is to say, people outside the organizations cannot search for information intrinsic to the organizations or even the names of organizations); hence, outside people are not informed of whether a specific organization exists in the system, thereby protecting the privacy of the organizations. The organization ID functions as a root namespace. The organization is a single level or multilevel and comprises at least one member. The term "level" refers to the structure of an organization. A single level organization, such as a small club (a table tennis club, or a bicycling club) or a small company composed of 10 or less employees, has a relatively small number of members; hence, its members need not be defined by level. By contrast, a multilevel organization, such as a large company, is structured by duty at four levels, namely business groups, departments, divisions, sections, or structured by member position at 15 levels, namely job grade 1, job grade 2 . . . job grade 15. In the system of the present invention, a single member may join two or more organizations at the same time and own organization IDs corresponding to the organizations, respectively. For example, a specific member joins three organizations, namely a sports club, a charity club, and a company, at the same time, and thus the member owns three different organization IDs corresponding to the organizations, respectively. In the database 20, member information essentially pertaining to each member comprises an organization ID corresponding to an organization associated with the member, an account number, a password, and check-in information.

The server 10 comprises servo modules (a servo module group) as follows: a first network communication module 12, a login verification module 14, a check-in request generating module 16, and an attendance evaluation module 18. A network connection which complies with TCP protocol (including Socket and Web Socket Connection), HTTP protocol, or HTTPS protocol is created between the first network communication module 12 and the second network communication module 32 of the mobile communication device 26 disposed at the client end. The login verification module 14 receives an organization ID, an account number and a password which have been uploaded by a specific member through the mobile communication device 26 and then verifies the organization ID, the account number and the password in accordance with organization IDs, account numbers and passwords which are attributed to the member information and stored in the database 20. The check-in request generating module 16 receives e-map coordinates, a specified time of check-in, and at least one recipient (i.e., a person who is requested to check-in, the selecting way is usually by checking off the member of an organization directory) uploaded by a person with authority (such as a supervisor or a system administrator). Then, the check-in request generating module 16 performs mapping at a recipient (i.e., a member selected from the organization directory) to generate a recipient list (i.e., a push ID of the selected member). Finally, the check-in request generating module 16 generates a check-in request in accordance with the uploaded e-map coordinates, specified time, and recipient list. The recipient list comprises at least one push ID corresponding to a member's receive device (i.e., the mobile communication device 26). The check-in information is received by the attendance evaluation module 18 and stored in the member information of the database 20. All the check-in information related to a specific period and contained in the member information is compiled to become an attendance information.

In an embodiment of the present invention, the server 10 and the database 20 are deployed on a specific number of apparatuses, but the present invention is not limited thereto. For instance, both the server 10 and the database 20 may be deployed on the same apparatus. Alternatively, the server 10 and the database 20 are deployed on cluster-structured apparatuses, respectively, or on differently located cluster-structured apparatuses.

The e-map coordinates are attributed to a single point on the e-map and marked by a person with authority. Alternatively, the e-map coordinates is referred to as the scope defined with a plurality of coordinates on the e-map. In an embodiment of the present invention, a fault-tolerant distance value is additionally preset. For example, a fault-tolerant distance of 50 meters means that an outward extension of 50 meters from the configured coordinates is included in the tolerant scope of the check-in location. The specified time of check-in includes an one-off time and a periodic time. The one-off time is, for example, shown as "yyyy/mm/dd, 9:00 a.m. through 12:00 p.m." The periodic time is, for example, shown as "Mondays through Fridays, 9:00 a.m. through 12:00 p.m." In an embodiment of the present invention, only the check-in information within a specified period of time is allowed to be uploaded to the server 10, and thus no member can check in after the expiration of the specified time. Hence, the database 20 does not record "invalid check-in". In another embodiment of the present invention, the check-in information generated after the expiration of the specified time is allowed to be uploaded to the server 10 such that any person with authority can subsequently interpret manually or perform software-based screening on check-in records generated after the expiration of the specified time to determine whether any of the check-in records can be included in the members' attendance information (for example, regarding the check-in after the expiration of the specified time as late). The recipient is specified by selecting from the organization directory a specific member, specific levels of an organization, a specific group list, or all the members within an organization. The organization directory is edited by any person with authority (such as a system administrator). The other members may search or use, but not edit, the organization directory. The specific group list is also edited by a person with authority, such as "a first-class supervisor at each unit/level within the organization," "a second-class supervisor at each unit/level within the organization," and "the minor staff at each unit/level within the organization." The members on this specific group list are initially scattered at many units/levels and thus must be manually compiled to generate the specific group list for later use.

The push gateway 22 generates a push notification in accordance with the check-in request and sends the push notification through an external push server 24 (such as: MPNS, GCM, and APNS). If, according to the database 20, a specific receiving-end device is an iOS device (such as iPhone or iPad), the push gateway 22 generates the push notification in accordance with a format required for APNS and then sends the push notification through APNS. The same goes for the other platforms.

The mobile communication device 26 (such as a smartphone or a tablet running iOS, Android or Windows Phone operation system) comprises a positioning module 30 and executes an application (also known as App for short) 28. The positioning module 30 generates current coordinates in accordance with the current location of the mobile communication device 26. The application 28 comprises a second network communication module 32, a login module 34, a function locking module 36, a check-in module 38, and a check-in reminding module 40. The second network communication module 32 creates a network connection with the first network communication module 12 of the server 10, wherein the network connection complies with TCP protocol, HTTP protocol or HTTPS protocol. The login module 34 receives an organization ID, an account number, and a password entered by a user (i.e., a member) and uploads them to the server 10. After receiving the push notification of the check-in request, the function locking module 36 locks all executable functions of the application 28 enabled with the organization ID (i.e., using the organization ID, which received the push notification of the check-in request, to login), allows the application 28 to execute the check-in operation only, and unlocks after the check-in operation is done. Hence, after the member has received the check-in request, the application 28 prevents, by a compulsory technical means, the member from operating any other executable functions (such as chatting, posting pictures/stickers/emojis/emoticons, browsing bulletin boards, using voice calls/voice messages, performing file transfer, and so forth) of the application 28 enabled with the organization ID until the member finishes performing the check-in operation. The above-mentioned is one of the essential technical features of the present invention. The check-in module 38 executes a check-in operation. The check-in operation entails receiving a check-in instruction at the e-map coordinates or within a distance of the e-map coordinates in accordance with the specified time of the check-in request, so as to upload the check-in information to the server 10. The check-in information each comprises a check-in time stamp and current coordinates. The check-in reminding module 40 generates a reminding alert in accordance with e-map coordinates and specified time of the check-in request. For instance, in an embodiment of the present invention, the reminding alert "approaching check-in location" or "has reached check-in location" is generated as soon as the member's current location approaches or reaches e-map coordinates. In an embodiment of the present invention, the reminding alert "check-in specified time is going to expire" or "check-in specified time has expired" is generated as soon as the specified time is going to expire or has expired. In an embodiment of the present invention, the reminding alert "check-in operation is ready to begin" is generated as soon as the member reaches e-map coordinates before the specified time. In an embodiment of the present invention, the reminding alert "check-in specified time is going to expire" is generated when the specified time is going to expire but the member has not yet checked in. In an embodiment of the present invention, the reminding alert "check-in specified time is going to expire, and you are still XX meters away from the check-in location" is generated when the specified time is going to expire, but the member has not yet checked in and reached e-map coordinates. In an embodiment of the present invention, the member's arrival at e-map coordinates before the specified time automatically triggers the generation of the check-in instruction and the generation of the reminding alert "check-in operation is done."

The check-in operation begins upon "receiving a check-in instruction" and ends at "uploading check-in information to the server 10." However, there are plenty of causes of a failure to upload the check-in information instantly; for example, the mobile communication device 26 cannot create a network connection at the moment. To deal with the aforesaid situation, an embodiment of the present invention is characterized in that: if the check-in operation fails to create a network connection or if a network connection is interrupted temporarily, the check-in information can be stored temporarily in a memory of the mobile communication device 26 such that the check-in information can be uploaded to the server 10 as soon as a network connection is created, and in consequence the check-in information is never distorted (wherein check-in time stamp still indicates the original check-in time and thus has nothing to do with the uploading time) no matter when the check-in information is uploaded. Afterward, if the attendance evaluation module 18 compiles the check-in information to generate attendance information, the check-in information (uploaded later) is still regarded as valid.

Regarding the function locking module 36 of the present invention, "locking all executable functions of the application enabled with an organization ID" means that "except for a check-in function and its related required processes, all the other functions of the application 28 are temporarily locked and thus cannot be executed." If a specific member joins multiple organizations and one of organizations sends a check-in request, only the functions of the application 28 enabled with the organization ID of "the organization which sends the check-in request" will be locked and thus cannot be executed. If the member logs in to the other organizations with the other organization IDs, all the executable functions will not be affected (i.e., all executable functions are enabled after the member logs in with the other organization IDs). In the aforesaid example, a specific member joins three organizations, namely a sports club, a charity club, and a company, at the same time. Assuming that the company sends the check-in request to all its employees, but the member does not execute a check-in operation according to the request. After logging in with the company's organization ID, the member cannot execute any functions other than the check-in. If the member logs in with the organization ID of the sports club or the charity club, all the executable functions will not be affected. In an embodiment of the present invention, the application 28 uses at least two layers of view to display the graphical user interfaces of different functions, wherein the check-in function (i.e., a graphical user interface related to the check-in module 38) exclusively occupies one of the layers of view, and the view of the check-in function is set to be "always-on-top." During the locked period, the other lower layers of view cannot be executed. For instance, the check-in function is presented by a pop-up window, which is "always-on-top" until the check-in operation is done.

In another embodiment of the present invention, every process (i.e., function/process) of the application 28 is assigned a value indicative of executing priority, and the priority of a process related to the check-in function is configured to be higher than the other functions. When the function locking module 36 executes a lock, only the execution of a process with a high priority value (such as the check-in function and its related required processes) is allowed, whereas the other processes with a low priority value can be executed after the check-in operation is done. In yet another embodiment of the present invention, the process of every function of the application 28 is provided with an executing flag such that, after the application 28 receives the login with an organization ID and receives the push notification of the check-in request, the function locking module 36 executes the process of a lock function locked with the organization ID to therefore allow the executing flag of the check-in function and its related required process to be set to "enabled" (i.e., executable), whereas the executing flag of the other functions is set to be "disabled" (i.e., not executable). After the function locking module 36 executes unlocking, the executing flag of all processes is reset to "enabled." According to the present invention, before executing a process, the application 28 inspects its executing flag, wherein only the process with an "enabled" flag is executable. When the mobile communication device 26 executes the application 28 to receive the push notification of a check-in request and thus locks all the executable functions enabled with the organization ID which received the push notification, the application 28 does not lock any executable functions enabled with the other organization IDs.

Figure 2:
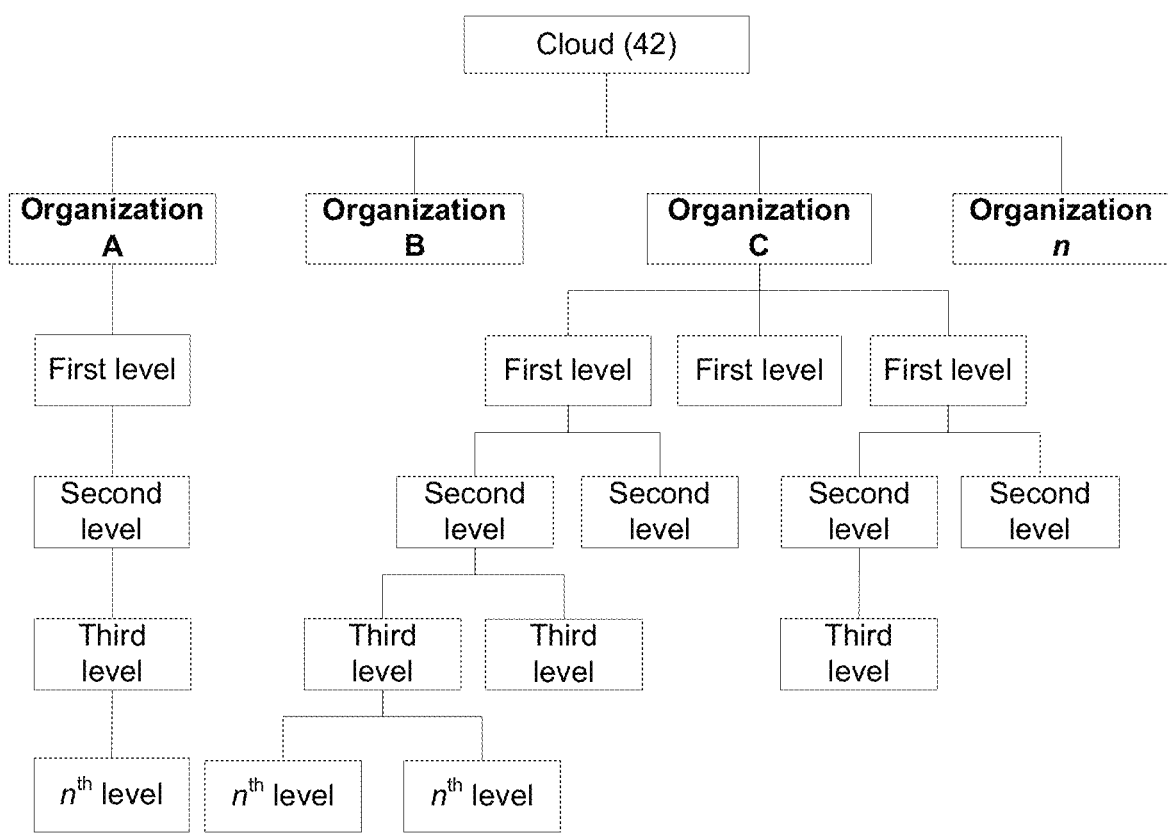
FIG. 2 is a schematic view of organizations and levels of a cloud according to the embodiment of the present invention.

Referring to FIG. 2, there is shown a schematic view of organizations and levels of a cloud 42 according to the preferred embodiment of the present invention. The cloud 42 of the present invention comprises organizations which support structures at all levels. Each organization is structured by level, ranging from a single level to a plurality of levels. The levels are followed by members (not shown), ranging from no member to a plurality of members. As shown in FIG. 2, organization A features a vertical (also known as high-rise or high-tower) level structure and thus fits for level classification based on members' grades, for example, with the first level defined by "job grade 15", the second level by "job grade 14", the third level by "job grade 13", and so forth, wherein job grade 13 or higher is indicative of a high-level supervisor. According to the present invention, the check-in request generating module 16 specifies the level of check-in such that, for example, if all high-level supervisors within the organization, i.e., first through third levels, are required to attend a high-level supervisor workshop held overseas, the recipient for the check-in request will be selected to be "first through third levels." Referring to the diagram, the level structure of organization B is restricted to a single level and thus is suitable for those organizations with a small membership or a flattening structure, such as a club, a small company, and a small group devoted to the pursuit of common interests. Referring to the diagram, organization C has a pyramidal level structure and thus is typical of various medium-sized or large-sized companies and groups. According to the present invention, the check-in request is sent to a specific level in an organization. For example, a specific team (say, a third-level procurement team) of a specific department under a specific business group is scheduled to make procurements at a warehouse store, and thus a check-in request which requests shoppers to gather at the warehouse store is sent to the team. The aforesaid flexible configuration of an organization structure with a plurality of levels with a view to sending a check-in request to a specific level of the organization is one of the essential technical features of the present invention.

In an organization, such as organization A and organization C, which has a plurality of levels, the levels each have an administrator with configuration authority. In a commercial organization, the paramount administrator is typically a MIS engineer, whereas administrators at the levels are supervisors (such as business group heads, department heads, division heads, section heads, etc.) Authority is usually awarded to an administrator as soon as the organization associated with the administrator is established or an account number of the administrator is created, though it is still possible to award authority to administrators after their account numbers have been created. According to the present invention, given the namespace data structure technology, none of the data pertaining to each organization is available to outsiders. Account numbers (i.e., members' account numbers) for use with each organization are always unique even when created by the same coding rule (such as employee numbers "0001", "0002", "0003", and so forth); hence, each organization can create account numbers for its members in a flexible manner without worrying that an account number newly created is already in use by a member of another organization. Even if multiple organizations use a member's mobile phone number or Email account username as the account number (or by filling it in the field "contact information"), mobile phone numbers or Email account usernames of members of the other organizations cannot be searched for, provided that the search is conducted in an inter-organization manner. In doing so, no employee is disturbed by external people, but a search for information pertaining to all members within any organization can be conducted, using a mobile phone number, Email account username, or keyword. In this regard, internal organizational search is not described in detail herein, as it is already disclosed in the prior art. Another essential technical feature of the present invention is as follows: organizations are differentiated from each other by organization ID and namespace data structure to prevent external people to retrieve the information of the member of the organization.

Figure 3A:
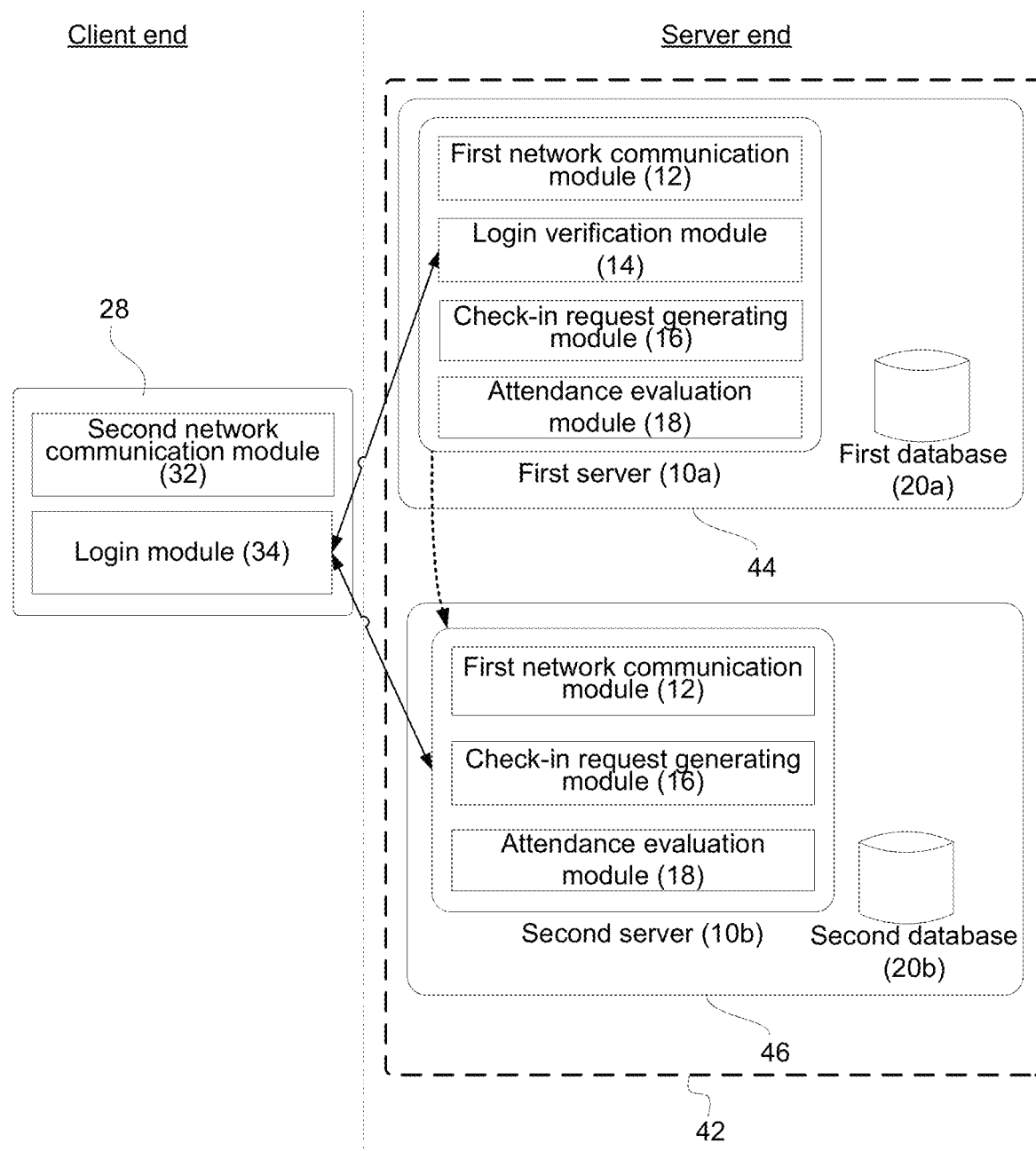
FIG. 3A is a schematic view of cloud deployment models according to the embodiment of the present invention.
Figure 3B:
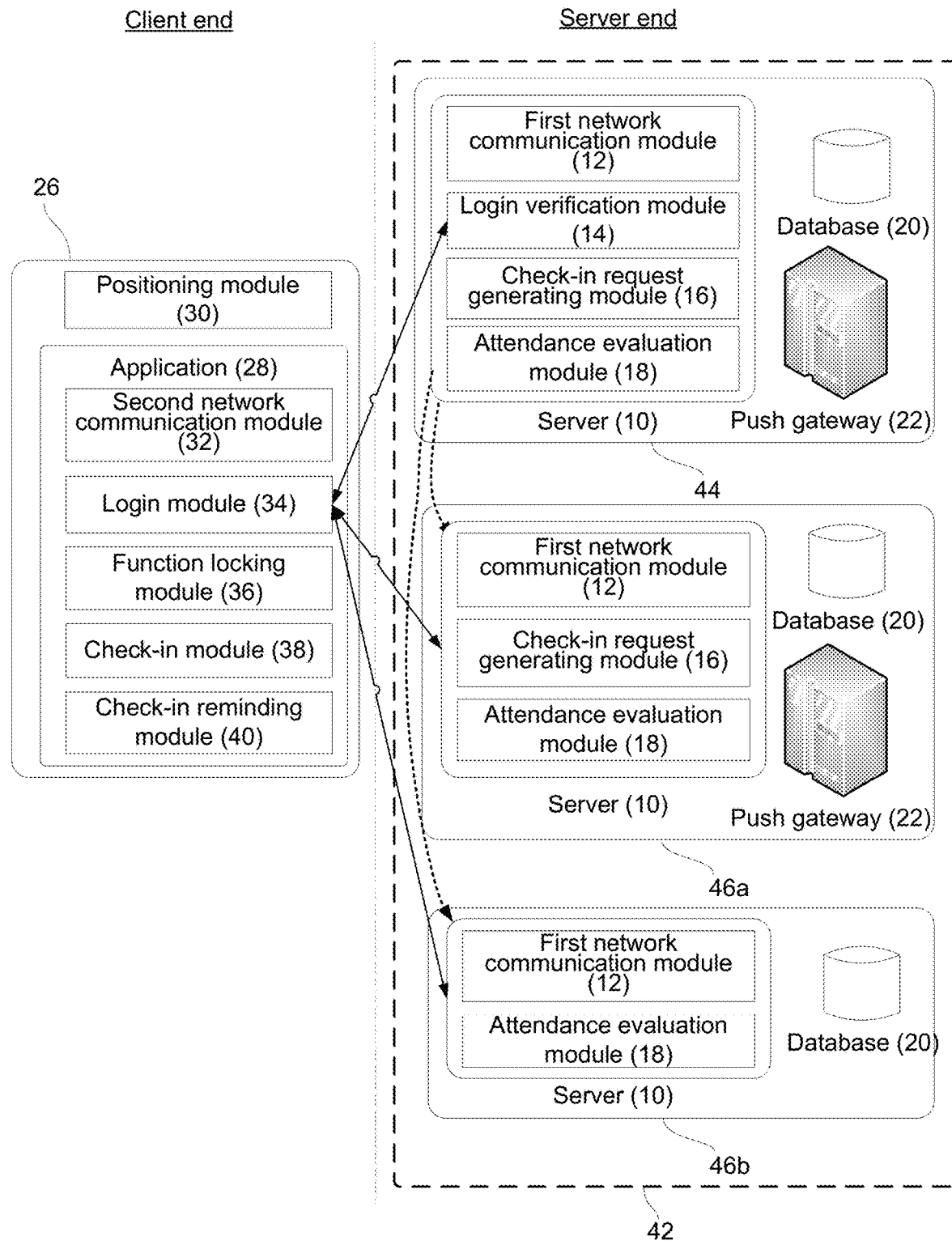
FIG. 3B is another schematic view of cloud deployment models according to the embodiment of the present invention.

Referring to FIG. 3A and FIG. 3B, there are shown schematic views of deployment models of the cloud 42 according to the embodiment of the present invention. FIG. 3A and FIG. 3B illustrate the deployment models of the cloud 42, a network connection created between the mobile communication device 26 and the cloud 42, and redirection. FIG. 3A and FIG. 3B do not show the push server 24, because the push notification is inapplicable. Referring to FIG. 3A, the cloud 42 of the present invention provides two deployment models, namely a public cloud model and a hybrid cloud model. The public cloud model is characterized in that the server 10 (or a first server 10a) at the server end, the database 20 (or a first database 20a), and the push gateway 22 are fully provided by a service provider. In the situation where typical companies or clubs do not have any strict requirements for information security and control, their service access takes place in a public cloud 44 fully. The hybrid cloud model is built on a mix of the public cloud 44 and a private cloud 46, wherein some servo modules and apparatuses are deployed in the public cloud 44, whereas the other servo modules and apparatuses are deployed in the private cloud 46. According to the hybrid cloud model, the IP addresses of the servo modules of the private cloud 46 are stored in a "servo module location-related information". In the situation where there are strict requirements for information security and control, the hybrid cloud model requires that a second server 10b and a second database 20b be deployed in the private cloud 46, and its service access takes place partly in the public cloud 44 and partly in the private cloud 46. The key to determining whether the public cloud 44 or the private cloud 46 is going to be accessed by the application 28 of the mobile communication device 26 lies in the servo module location-related information. Regardless of the cloud deployment models adopted by a company/club, the application 28 is always verified with the login verification module 14 of the first server 10a located at the public cloud 44 at the point in time of login. Due to the modularization and distribution-oriented design of the servo module group of the present invention, the servo module group and the push gateway 22 are freely disintegrated and disposed in different IDC (i.e., the public cloud 44 and the private cloud 46) to meet corporate customer needs, which is yet another essential technical feature of the present invention. The hybrid cloud model of the present invention is characterized in that: the servo module group is disintegrated and disposed in the public cloud 44 and the private cloud 46 while the login verification module 14 is still disposed at the public cloud 44, wherein redirection is effectuated with the servo module location-related information.

FIG. 3B shows that two private clouds 46a, 46b are associated with different servo module groups and represent IDC of different companies, respectively, to thereby illustrate that companies/clubs use the same the application 28 to access services regardless of the types of the cloud deployment models adopted by the companies/clubs. Assuming that organization A is a typical company or club which does not have any strict requirements for information security and control, a servo module group (i.e., the first network communication module 12, the login verification module 14, the check-in request generating module 16, the attendance evaluation module 18, etc.) and apparatuses which organization A accesses are deployed on the public cloud 44. Hence, all its records comprise attendance information stored in the database 20 of the public cloud 44 and kept by a service provider. Assuming that organization C is a financial enterprise which has strict requirements for information security and control, and thus all personal data-related servo modules and attendance information must be provided and kept in their own IDC (or rented virtual hosts, hosting data center); hence, except for the login verification module 14 (i.e., connecting interface for login) which is still disposed at the public cloud 44, the other apparatuses and the servo modules are disposed at the private cloud 46a (i.e., self-built IDC of organization C) and recorded in the servo module location-related information. When a member of organization C accesses the cloud 42 with the application 28, the connecting interface configured initially for use with the login is still disposed at the public cloud 44 (i.e., the login verification module 14). Upon completion of the login verification, the system effectuates redirection (as shown in the diagram, the dashed lines each carry a unidirectional arrow indicative of network connection redirection) in accordance with the servo module location-related information as soon as the application 28 receives an instruction corresponding to the servo module group. For instance, the user selects a check-in function attributed to the application 28 and corresponding to the attendance evaluation module 18; meanwhile, the system effectuates redirection in accordance with "the IP address of the attendance evaluation module 18 disposed at the private cloud 46a" recorded in the servo module location-related information. Afterward, the application 28 accesses the attendance evaluation module 18 of the server 10 of the private cloud 46a directly, and in consequence sensitive data (such as attendance information) of organization C can be kept fully in the database 20 of the private cloud 46a. Assuming that organization D also has strict requirements for information security and control and thus places part of personal data-related apparatuses and servo modules at the private cloud 46b such that its sensitive data can also be kept fully in the database 20 of the private cloud 46b.

From the perspective of a deployment model, to meet corporate customer needs, the operation of the hybrid cloud is slightly customized (i.e., disintegrating and disposing servo modules); however, the hybrid cloud model of the present invention can still use the same said application 28 to access the private cloud 46, at the client end and without using a dedicated application to access the private cloud 46, because, as mentioned before, a connecting interface for login is still at the public cloud 44 (i.e., the login verification module 14). Hence, a service provider no longer needs to customize applications for use by different corporate customers. In the aforesaid example, organization A, organization C, and organization D adopt different deployment models of the cloud 42; however, in the eyes of users at the client end, the application 28 of the same version is always executed on the mobile communication device 26, and thus it is not necessary for the three different organizations to adopt three different versions of the application 28, respectively, and in consequence App launching time, process flow, and manpower (for example, launching a product on Apple's AppStore necessitates a strict review procedure) can be reduced greatly by using single said application 28 to provide services to all corporate customers. A further essential technical feature of the present invention is that a single connecting interface and a single application access the public cloud model and the hybrid cloud model.

In another embodiment of the present invention, authenticating a digital certificate (also known as e-certificate) precedes effectuating redirection to the private cloud 46, so as to confirm the identity of the private cloud 46 and prevent any fake server from lurking around in attempt to steal data. In this embodiment, at the beginning of a process of configuring the private cloud 46 by an administrator thereof (i.e., by registering the private cloud 46 with the public cloud 44), the storage path of a digital certificate issued by a certificate authorizing unit and stored in the private cloud 46 must be entered and then subjected to validity authentication performed by a certificate authentication center, wherein the aforesaid technical features are not described in detail herein because "applying to a certificate authorizing unit for a digital certificate" and "using the API of a certificate authentication center to perform validity authentication" are already disclosed in the prior art. It is only when the validity authentication passes that the IP address of the private cloud 46 and its digital certificate are recorded in the servo module location-related information. After a specific user has passed login verification but before the user undergoes redirection to the private cloud 46, the login verification module 14 of the public cloud 44 verifies the user in accordance with the digital certificate information and IP address recorded in the servo module location-related information. This embodiment may also employ token technology whereby a token substitutes for the verification step directly during the valid period of the token, for example, within 24 hours from the first instance of authentication.

Figure 4:
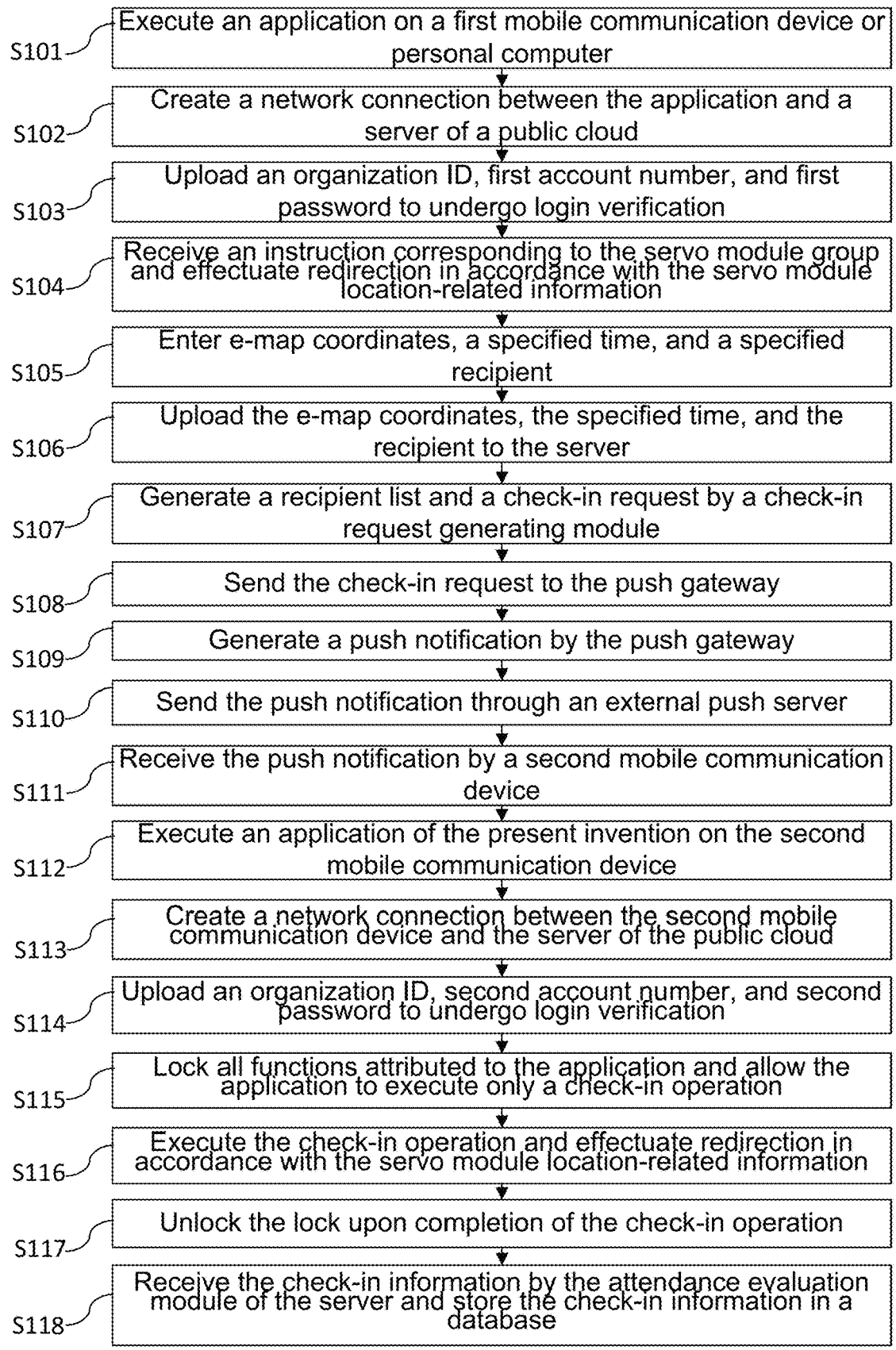
FIG. 4 is a flowchart of a method according to an embodiment of the present invention.

Referring to FIG. 4, there is shown a flowchart of a method according to an embodiment of the present invention. FIG. 4 illustrates the process flow as to how a first mobile communication device 26a or personal computer configures a check-in request and how a second mobile communication device 26b performs a check-in operation upon receipt of the check-in request. FIG. 4 is preferably read in conjunction with FIG. 1, FIG. 2, and FIG. 3A.

Referring to FIG. 4, the process flow of the method comprises the steps described below.

Step S101: execute the application 28 of the present invention on the first mobile communication device 26a or a personal computer. Assuming that a person with authority (a supervisor or a system administrator) is a first member of an organization, and the first member executes the application 28 with a personal computer or the first mobile communication device 26a (i.e., the mobile communication device 26, such as Apple's iPhone 5S.)

Step S102: create a network connection between the application 28 and the server 10 of the public cloud 44. Upon execution of the application 28, a network connection which complies with TCP protocol (including Socket and Web Socket Connection), HTTP protocol, or HTTPS (i.e., HTTP over SSL) protocol is created between the second network communication module 32 of the application 28 and the first network communication module 12 of the server 10 of the public cloud 44.

Step S103: upload an organization ID, a first account number, and a first password to undergo login verification. The first member enters the organization ID, the first account number, and the first password with the application 28. The organization ID denotes an organization associated with the first member. Afterward, the organization ID, the first account number, and the first password are uploaded to the server 10 of the public cloud 44 and then subjected to login verification performed by the login verification module 14 of the public cloud 44.

Step S104: receive an instruction corresponding to the servo module group and effectuate redirection in accordance with the servo module location-related information. The system redirects the application 28 of the first mobile communication device 26a in accordance with the servo module location-related information stored in the public cloud 44 as soon as the application 28 of the first mobile communication device 26a receives an instruction corresponding to the servo module group. For example, the first member selects configuration of the check-in request function (this selection instruction corresponds to the servo module, that is, the check-in request generating module 16) in the application 28; meanwhile, the system effectuates redirection of the application 28 in accordance with "the check-in request generating module 16 is disposed at the IP address of the private cloud 46" stated in the servo module location-related information, and then the application 28 accesses the check-in request generating module 16 of the server 10 of the private cloud 46 directly.

Step S105: enter e-map coordinates, a specified time, and a specified recipient. The first member uses e-map coordinates (i.e., check-in location) entered with the application 28, a specified time (i.e., check-in time), and at least one recipient specified. The recipient is specified by selecting from the organization directory a specific member, specific levels of an organization, a specific group list, or all the members within an organization. In this embodiment, it is assumed that a recipient selected from an organization directory by the first member comprises a second member.

Step S106: upload the e-map coordinates, the specified time, and the recipient to the server 10. In step S102, if the network connection created between the second network communication module 32 and the first network communication module 12 complies with TCP protocol, the step entails uploading the e-map coordinates, the specified time, and the recipient to the check-in request generating module 16 directly. In step S102, if the network connection thus created complies with HTTP protocol or HTTPS protocol, the step entails creating between the second network communication module 32 and the first network communication module 12 a network connection which complies with HTTP protocol or HTTPS protocol and then uploading the e-map coordinates, the specified time, and the recipient to the check-in request generating module 16.

Step S107: generate a recipient list and a check-in request by the check-in request generating module 16. The check-in request generating module 16 of the server 10 performs mapping in accordance with the recipient to generate a recipient list, wherein the recipient list comprises at least one push ID. Then, the check-in request generating module 16 generates the check-in request in accordance with the e-map coordinates, the specified time, and the recipient list.

Step S108: send the check-in request from the server 10 to the push gateway 22.

Step S109: generate a push notification by the push gateway 22. The push gateway 22 generates the push notification in accordance with the check-in request.

Step S110: send the push notification through the external push server 24. The external push server 24 is exemplified by MPNS, GCM, and APNS.

Step S111: receive the push notification by the second mobile communication device 26b. The second mobile communication device 26b is provided in the form of the mobile communication device 26, such as HTC OneX, and the user of the second mobile communication device 26b is presumably a second member of an organization.

Step S112: execute the application 28 on the second mobile communication device 26b.

Step S113: create a network connection between the second mobile communication device 26b and the server 10 of the public cloud 44. Upon execution of the application 28, a network connection which complies with TCP protocol, HTTP protocol or HTTPS protocol is created between the second network communication module 32 of the application 28 and the first network communication module 12 of the server 10 of the public cloud 44.

Step S114: upload an organization ID, a second account number, and a second password to undergo login verification. The second member enters the organization ID, the second account number, and the second password with the application 28 of the second mobile communication device 26b. The organization ID denotes an organization associated with the second member. Afterward, the organization ID, the second account number, and the second password are uploaded to the server 10 of the public cloud 44 and then subjected to login verification performed by the login verification module 14 of the public cloud 44.

Step S115: lock all executable functions of the application 28 enabled with the organization ID such that the application 28 is allowed to execute only a check-in operation. After the application 28 of the second mobile communication device 26b receives the push notification of the check-in request, the function locking module 36 examines and determines whether the second member has finished performing the check-in operation (i.e., having uploaded the check-in information successfully). If the check-in operation is not done, the function locking module 36 compulsorily locks all the executable functions of the application 28 enabled with the organization ID and restricts the second member's operation to the check-in operation.

Step S116: execute the check-in operation and effectuate redirection in accordance with the servo module location-related information. Since the function locking module 36 has locked all executable functions of the application 28 enabled with the organization ID, the second member can only execute the check-in operation. Upon execution of the check-in operation, the application 28 receives an instruction (i.e., a check-in instruction) corresponding to the servo modules (the attendance evaluation module 18), and thus the system effectuates redirection of the application 28 of the second mobile communication device 26b in accordance with the servo module location-related information stored in the public cloud 44. In this embodiment, the purpose of the servo module location-related information is to dispose the attendance evaluation module 18 (one of the servo modules) at the private cloud 46; hence, the aforesaid redirection entails switching the connection to the server 10 of the private cloud 46. The check-in operation entails receiving the check-in instruction (executing the check-in module 38 by the second member) at the e-map coordinates or within a distance of the e-map coordinates in accordance with the specified time of the check-in request, so as to generate the check-in information and upload the check-in information to the server 10. The check-in information each comprises a check-in time stamp and current coordinates.

Step S117: unlocks upon completion of the check-in operation. The check-in operation is done as soon as the second member uploads the check-in information to the attendance evaluation module 18 of the server 10. The function locking module 36 unlocks the application 28 such that the second member can execute the other functions of the application 28 at will.

Step S118: receive the check-in information by the attendance evaluation module 18 of the server 10 and store the check-in information in the member information of the database 20.

Figure 5:
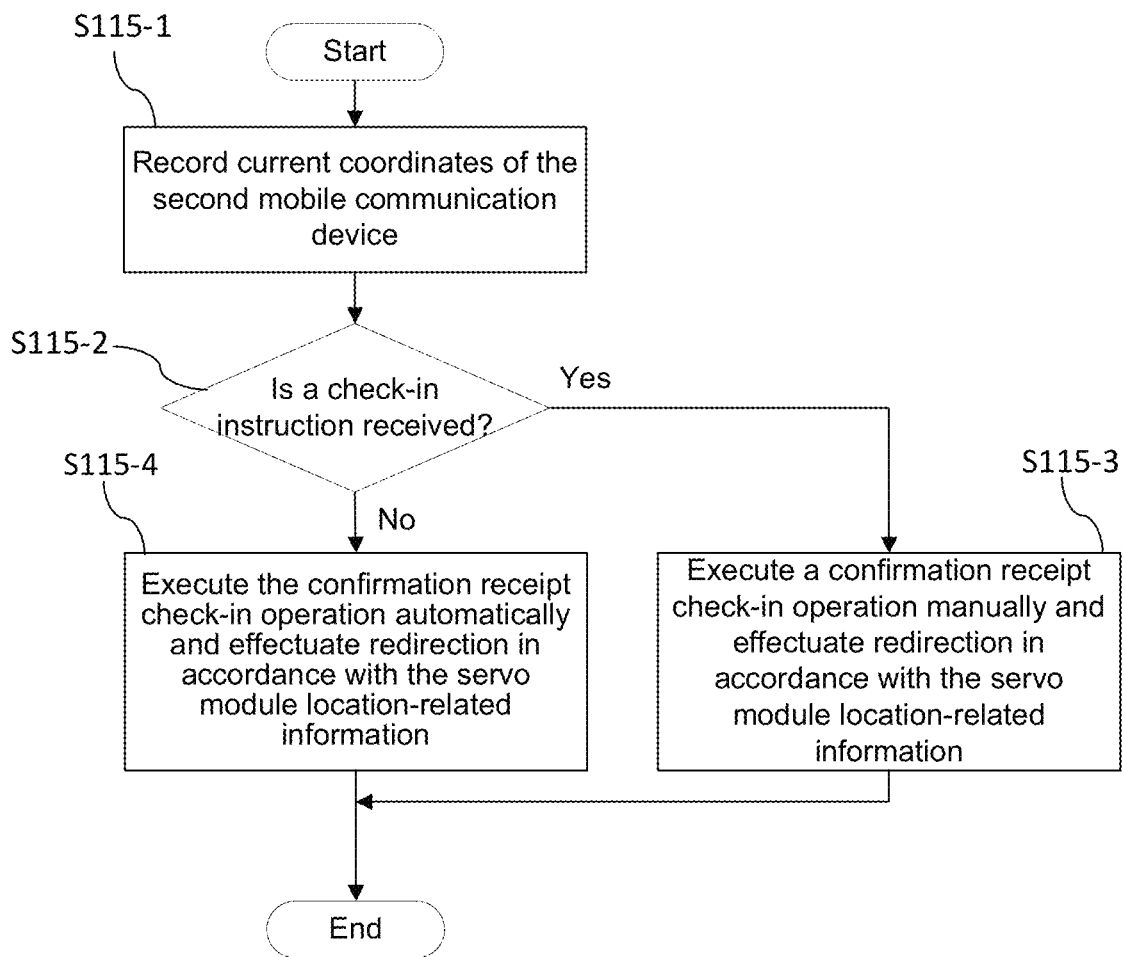
FIG. 5 is a flowchart of a sub-process of the method according to another embodiment of the present invention.

Referring to FIG. 5, there is shown a flowchart of a sub-process of the method according to another embodiment of the present invention. The sub-process comprises sub-steps between step S115 and step S116 of FIG. 4. The sub-process is described below. In another embodiment of the present invention, after the second member has received the check-in request, the check-in information pertaining to a point of departure are sent to the attendance evaluation module 18 of the server 10 to function as a confirmation receipt (also known as "read receipt") at a client end. The check-in time stamp in the check-in information is deemed the time at which the check-in request is read, whereas the current coordinates of the check-in information is deemed the point of departure (or receiving the original point of the check-in request). If the second member has not executed the check-in module 38 (i.e., the second member has not manually executed the confirmation receipt check-in operation), the check-in information pertaining to the point of departure is automatically sent back after the second member has moved by a specific distance. Step S115-1 entails recording the current coordinates of the second mobile communication device 26b. The check-in module 38 of the second mobile communication device 26b accesses the positioning module 30 to fetch the current coordinates of the second mobile communication device 26b. The current coordinates is deemed the point of departure. Step S115-2 entails determining whether to receive a check-in instruction. During a specific period of time, say, five minutes, the application 28 of the second mobile communication device 26b determines whether to receive a check-in instruction. If the determination is affirmative, go to step S115-3. If the determination is negative, go to step S115-4. Step S115-3 entails executing a confirmation receipt check-in operation manually, effectuating redirection in accordance with the servo module location-related information, receiving the check-in instruction (second member executes the check-in module 38) to generate the check-in information, and uploading the check-in information to the server 10, wherein the check-in information each comprises a check-in time stamp and current coordinates. Step S115-4 entails executing the confirmation receipt check-in operation automatically, effectuating redirection in accordance with the servo module location-related information, generating the check-in instruction to generate the check-in information, and uploading the check-in information to the server 10. If the second member does not execute the confirmation receipt check-in operation manually during a specific period of time and the second mobile communication device 26b has moved by a specific distance (for example, "having moved to a point located at least 500 meters away from the current coordinates"), the check-in module 38 will be automatically executed to generate the check-in information and upload the check-in information to the server 10. The "check-in information pertaining to a point of departure" generated in this embodiment function as a control group information for users to interpret, so as to assess the genuineness of the check-in information generated in step S116, for example, as to whether the time taken to travel from a point of departure to a destination is reasonable. The objective of this embodiment is to solve a technical problem, that is, the prior art lacks a control group information for use as a criterion for determining whether the check-in information is genuine.

In conclusion, a mobile check-in system and method disclosed by the present invention solve the technical problems which the prior art is confronted with to therefore allow commercial organizations to be embodied in flexible multilevel structured and generate the check-in request at a specific level, use a single cloud system to provide services to multiple commercial organizations, use a single application and a single connecting interface to access a hybrid cloud system, use compulsory check-in technology to lock the other functions, and allow any check-in locations to be specified at will.

The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A mobile check-in system, comprising:
a database for storing a plurality of member information, the member information each comprising a check-in information;
a server for accessing the database and creating a network connection with at least one mobile communication device having one of the member information, wherein the server generates a check-in request in accordance with e-map coordinates, a specified time, and a recipient list, wherein the recipient list comprises at least one push ID corresponding to one of the member information; and
a push gateway for generating a push notification in accordance with the check-in request and sending the push notification to the mobile communication device through a push server,
wherein the server receives through the network connection the check-in information uploaded from the mobile communication device, and the check-in information being stored in the database,
wherein a cloud comprises the database, the server, and the push gateway,
wherein the mobile communication device comprises a positioning module for generating current coordinates in accordance with a current location of the mobile communication device, wherein the mobile communication device executes an application to thereby create a network connection with the server and log in to the server, receives a check-in instruction to thereby generate the check-in information, and uploads the check-in information to the server through the network connection, wherein the check-in information each comprises a check-in time stamp and the current coordinates, and
wherein, after the mobile communication device executes an application to receive the push notification, all executable functions of the application are locked until the application executes a check-in operation.

2. The mobile check-in system of claim 1, wherein the check-in information related to a specific period and contained in the member information is compiled by the server to become an attendance information.

3. The mobile check-in system of claim 1, wherein, if the mobile communication device fails to create the network connection with the server, the check-in information is stored temporarily in a memory of the mobile communication device and is uploaded to the server after the network connection is created.

4. The mobile check-in system of claim 1, wherein the check-in operation is performed at the e-map coordinates or within a distance of the e-map coordinates in accordance with the specified time of the check-in request, wherein the application receives a check-in instruction to generate the check-in information and upload the check-in information to the server through the network connection, wherein the check-in information each comprises a check-in time stamp and current coordinates.

5. The mobile check-in system of claim 1, wherein generation of the check-in information by the mobile communication device undoes locking of the mobile communication device.

6. The mobile check-in system of claim 1, wherein an application executed by the mobile communication device further comprises a check-in reminding module for generating a reminding alert in accordance with the specified time and the e-map coordinates of the check-in request.

7. The mobile check-in system of claim 6, wherein the check-in reminding module generates the check-in instruction automatically in accordance with the specified time and the e-map coordinates of the check-in request when the e-map coordinates or a distance of the e-map coordinates is reached before the specified time expires.

8. The mobile check-in system of claim 1, wherein an application executed by the mobile communication device further comprises a check-in module for executing a confirmation receipt check-in operation which entails uploading the check-in information to the server, wherein the check-in time stamp in the check-in information indicates a time at which a check-in request is read, and the current coordinates in the check-in information indicates a point of departure.

9. The mobile check-in system of claim 8, wherein the confirmation receipt check-in operation is automatically executed after the mobile communication device has moved by a specific distance.

* * * * *